United States Patent [19]

Inamura

[11] Patent Number: 4,993,668
[45] Date of Patent: Feb. 19, 1991

[54] MOUNTING STRUCTURE FOR CAR-MOUNT DEVICES

[75] Inventor: Shigeaki Inamura, Kobe, Japan
[73] Assignee: Fujitsu Ten Limited, Kyogo, Japan
[21] Appl. No.: 467,518
[22] Filed: Jan. 18, 1990

Related U.S. Application Data

[62] Division of Ser. No. 200,123, May 27, 1988.

[30] Foreign Application Priority Data

May 29, 1987 [JP] Japan ............................ 62-85403
May 29, 1987 [JP] Japan ............................ 62-85404

[51] Int. Cl.⁵ ............................................. G12B 9/00
[52] U.S. Cl. ................................................. 248/27.3
[58] Field of Search ............. 248/551, 27.1, 27.3, 248/201, 221.3, 221.4, 224.3, 224.4, 906; 312/242, 7.1; 361/422; 369/10, 11, 12; 200/295, 296; 455/345

[56] References Cited

U.S. PATENT DOCUMENTS 4,550,944 11/1985 Simon et al.
4,572,465 2/1986 Rasca
4,577,818 3/1986 Clarisse
4,623,110 11/1986 Kanari
4,660,789 4/1987 Putnam
4,741,185 5/1988 Weinert et al.

FOREIGN PATENT DOCUMENTS

1064243 8/1959 Fed. Rep. of Germany
3706979 9/1987 Fed. Rep. of Germany
2903176 7/1989 Fed. Rep. of Germany

*Primary Examiner*—Ramon O. Ramirez
*Assistant Examiner*—Robert A. Olson
*Attorney, Agent, or Firm*—Wenderoth, Lind & Ponack

[57] ABSTRACT

A mounting structure mounts a car-mounted device, having a front panel projecting from a main body with a step therebetween, in an instrument panel, with the front panel projecting from a mounting hole of the instrument panel. A mounting tube has detent holes formed in side walls thereof and is inserted and fixed into the mounting hole from the front thereof. Mounting pieces are fixed to side walls of and mount the main body to the mounting tube and have integrally formed elastic pieces that can be angularly dislocated within a flat plane perpendicular to the inserting direction and that have detent pawls formed at end parts thereof. The detent pawls of the elastic pieces engage with the detent holes when the main body is mounted to the mounting tube.

6 Claims, 8 Drawing Sheets

Fig.8

MOUNTING STRUCTURE FOR CAR-MOUNT DEVICES

This is a division of application Ser. No. 07/200,123, filed May 27, 1988.

BACKGROUND OF THE INVENTION

1. Field of the Invention

This invention relates to a mounting structure for mounting a car-mounted device such as a radio or a magnetic tape player.

2. Description of the Prior Art

In the case of incorporating car-mounted devices such as a radio and a magnetic tape player into the instrument panel of an automotive vehicle, two methods hitherto have been used mainly in Japan, that is, a method of fixing a main body of the device by screws or the like to the car body from the back side of a mounting hole formed in the instrument panel, and a method of inserting the main body of the device from the front of a mounting hole formed in the instrument panel. As employed herein, "front" of the instrument panel refers to the side thereof visible from the interior of the vehicle. In other nations the latter method prevails because of its excellent efficiency. In the former method, the step difference between the instrument panel and the front panel of the car-mounted device may be relatively lessened.

Figure 1:
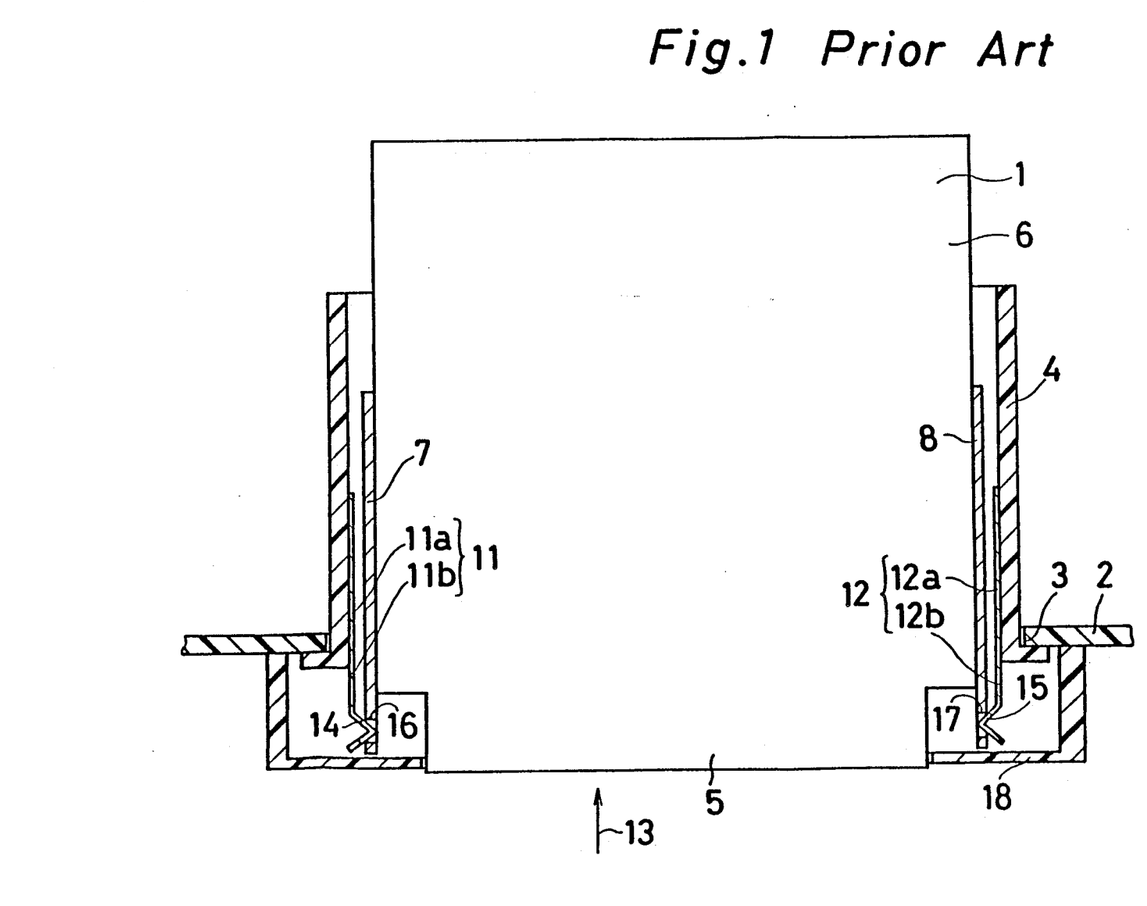
FIG. 1 is a sectional view showing a mounting structure for a car-mounted device according to the prior art.

FIG. 1 is a sectional view showing the latter mounting structure. A car-mounted device 1 is housed in a mounting tube 4 fixed in a mounting hole 3 formed in an instrument panel 2. A front panel 5 of this car-mounted device 1 projects from a main body 6 thereof.

Mounting members or pieces 7, 8 are fixed with screws or the like to opposite sides of main body 6. Elastic pieces or members 11, 12 are fixed at opposite sides of mounting tube 4. Detent pawls 14, 15 are formed in elastic members 11, 12 at upstream ends thereof in an inserting direction 13 of the car-mounted device 1, and detent pawls 14, 15 are inserted into detent holes 16, 17 formed in the mounting pieces 7, 8. In this condition, the front panel 5 projects from the mounting hole 3, and the car-mounted device 1 is incorporated in the instrument panel 2. A frame body 18 is provided around front panel 5 in order to enhance the aesthetic effect.

In such mounting structure, there is a relatively large degree of freedom between the size of the main body 6 and the size of the mounting hole 3, that is, the size of the mounting tube 4, so that there are few limitations in use of the car-mounted device 1 in various models of automobiles, which means that versatility is high.

In such prior art device illustrated in FIG. 1, in order to obtain a proper spring force, the elastic pieces 11, 12 must be formed with relatively long deflection parts 11b, 12b extending from base parts 11a, 12a fixed to the side walls of the mounting tube 4 in the upstream direction. Thus, the projection of the front panel 5 from the surface of the instrument panel 2 may be, for example, as large as 16 mm, which is not suitable in appearance. To solve this problem, if the elastic pieces 11, 12 are disposed behind the mounting tube 4, spaces for accepting the detent pawls 14, 15 of the elastic pieces 11, 12 must be formed in the device main body 6, and this is not suitable from the viewpoint of saving of space. However, if these problems could be solved, then this type of mounting structure could be employed in Japan, and the parts for Japanese market products and those for overseas market products could be commonly used, so that a reduction of costs could be expected.

SUMMARY OF THE INVENTION

It is hence a primary object of this invention to provide a mounting structure for car-mounted devices that has excellent versatility and improved appearance.

To achieve the above object, this invention provides a mounting structure for a car-mounted device, having a front panel projecting from a main body with a step therebetween, in an instrument panel, with the front panel projecting from a mounting hole in the instrument panel. The structure includes a mounting tube having detent holes formed in side walls thereof and being inserted and fixed into the mounting hole from the front of the instrument panel. Mounting pieces are fixed to side walls of the main body and mount the main body to the mounting tube. The mounting pieces have integrally formed elastic pieces that can be angularly dislocated within a flat plane perpendicular to the inserting direction and that have detent pawls formed at end parts thereof. The detent pawls of the elastic pieces engage with the detent holes when the main body is mounted to the mounting tube.

In a preferred embodiment, guide walls, formed in forward end portions of side walls of the mounting tube, open outwardly and guide the elastic pieces by pressure from the outside.

In another preferred embodiment, the elastic pieces are formed with guide pieces inclined about the inserting direction and opened forwardly.

According to these embodiments, the car-mounted device is housed in the mounting tube fixed in the mounting hole formed in the instrument panel. The elastic pieces are fixed to the side walls of the main body, and the detent pawls are formed at the end parts of the elastic pieces. Each detent pawl is angularly dislocatable within a flat plane perpendicular to the inserting direction of the car-mounted device into the mounting tube, and a detent hole corresponding to each detent pawl is formed in the side wall of the mounting tube. Thus, by inserting the car-mounted device from the front of the mounting tube, the detent pawl of the elastic piece is inserted into the detent hole within a gap between the mounting hole and the front panel, whereby the car-mounted device is installed with its front panel projecting outwardly from the mounting hole of the instrument panel.

Since the elastic piece on which the detent pawl is formed is formed in a manner to be free to dislocate angularly within a plane perpendicular to the inserting direction of the car-mounted device, the extent of projection of the front panel from the instrument panel can be restricted, and appearance is improved.

In addition, since the parts may be commonly used both for overseas market products and for Japanese market products, costs can be reduced.

Moreover, in still another preferred embodiment, a frame body is removably installed around the peripheral edge of the main body, and in such a state, the car-mounted device is inserted into the mounting tube from the front thereof. The detent pawls of elastic pieces fit into the detent holes in a normal state, in a gap between the mounting hole in the instrument panel and the front panel, and the pawls are removed from the detent holes by deforming the elastic members against their elastic force.

According to another embodiment, the car-mounted device is also inserted into the mounting tube fixed in the mounting hole formed in the instrument panel. On the side walls of the main body are fixed mounting pieces having elastic pieces, and detent pawls are formed at end parts of the elastic pieces. Each detent pawl is angularly dislocatable within a flat plane perpendicular to the inserting direction of the car-mounted device into the mounting tube, and is, in its natural state, urged by its elasticity in a direction away from a detent hole in the mounting tube. Therefore, by inserting the car-mounted device into the mounting tube from the front thereof and by fitting a frame body about the peripheral edge of the main body, each elastic piece is pressed and dislocated by the frame body against its elastic force in the gap between the mounting hole and front panel. As a result, the detent pawl is inserted into the detent hole, and the car-mounted device is installed with its front panel projecting out of the mounting hole in the instrument panel.

In this detent or mounted state, the elastic piece always is elastically urged by its elastic force in a direction to be withdrawn from the detent hole. Thus, by removing the frame body from the main body, the elastic pieces are restored, and the detent pawls move from the detent holes, so that the car-mounted device can be dismounted from the mounting tube.

Thus, in this embodiment, since the elastic piece having a detent pawl is formed in a manner free to angularly dislocate within a flat plane perpendicular to the inserting direction of the car-mounted device, the projection of the front panel from the instrument panel can be restricted, and appearance is enhanced. Also, since parts of overseas market products and Japanese market products can be commonly used, costs can be reduced. Furthermore, the elastic piece is bent to extend, in its natural state, in a direction away from the mounting tube, and therefore, by detaching the frame body, the elastic piece is restored and the detent state is canceled, so that efficiency of dismounting the car-mounted device can be improved.

BRIEF DESCRIPTION OF THE DRAWINGS

These and other objects of this invention, as well as features and advantages thereof, will be better understood and appreciated from the following detailed description taken in conjunction with the accompanying drawings in which.

DETAILED DESCRIPTION OF THE PREFERRED EMBODIMENTS

Referring now to the drawings, preferred embodiments of this invention are described below.

Figure 2:
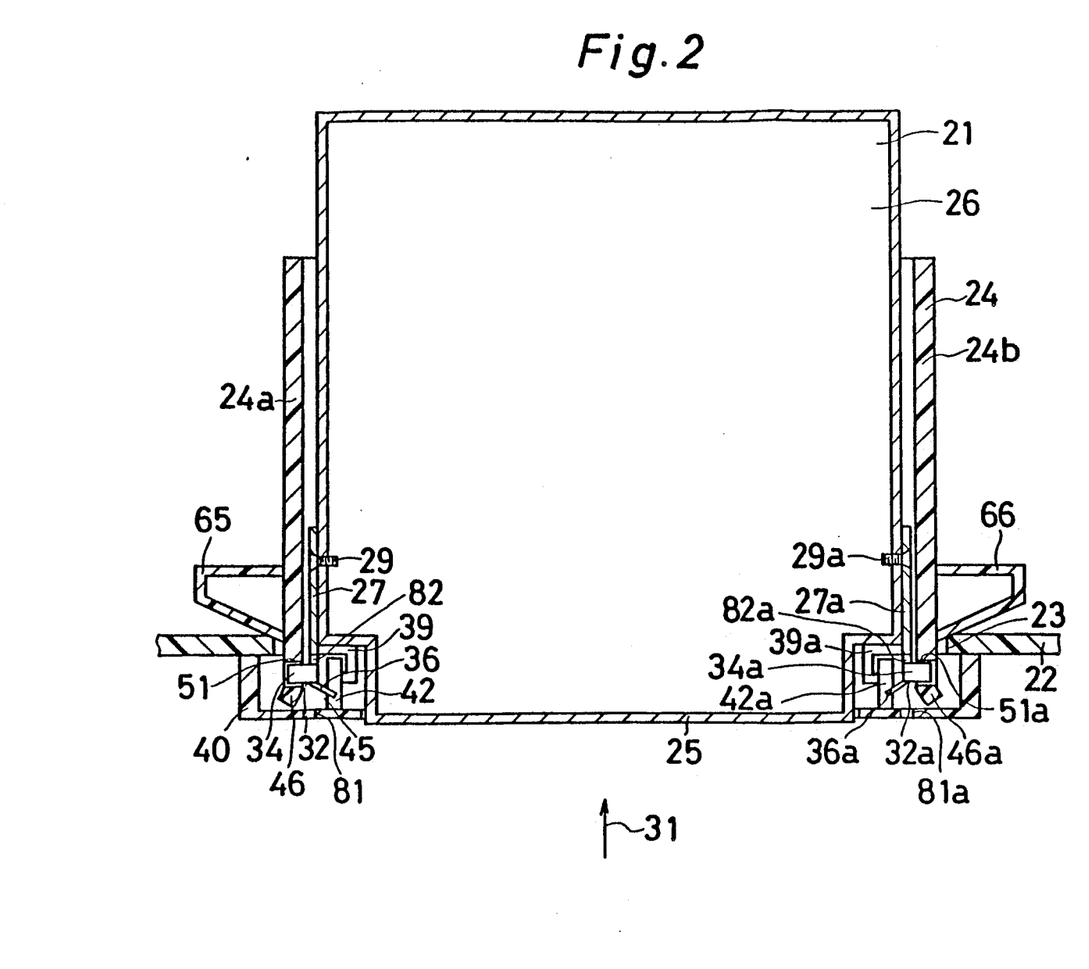
FIG. 2 is a sectional view showing a mounting structure of a car-mounted device according to an embodiment of this invention.
Figure 3:
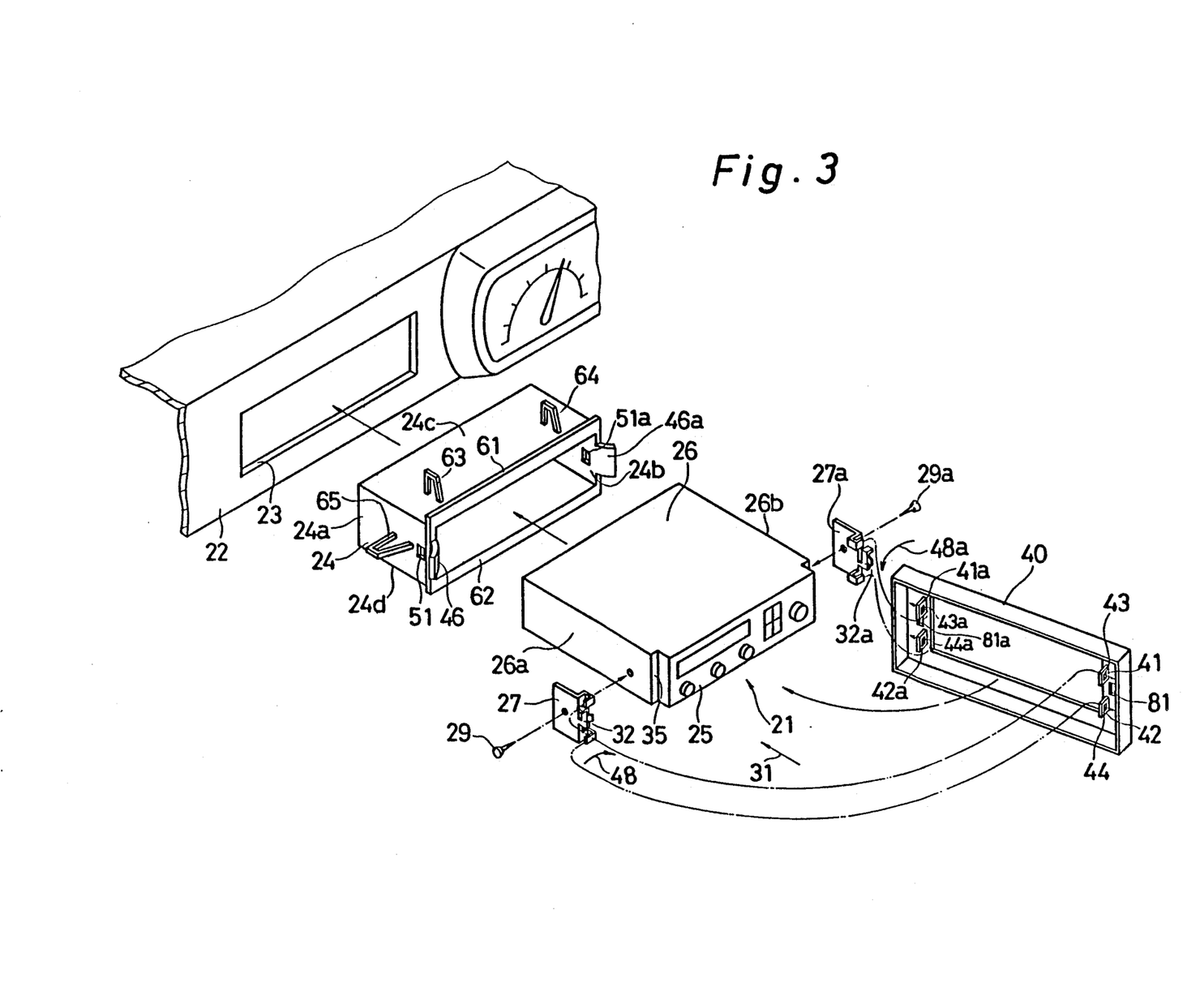
FIG. 3 is a perspective exploded view showing the mounting structure of FIG. 2.

FIG. 2 is a sectional view showing a mounting structure of a car-mounted device 21 according to an embodiment of this invention, and FIG. 3 is a perspective exploded view showing its mounting procedure. For example, when installing a car-mounted device 21, such as a radio or a magnetic tape player, in a mounting hole 23 formed in an instrument panel 22, a mounting tube 24 is fitted preliminarily. From an upper wall 24c and a lower wall 24d of the mounting tube 24 extend flanges 61, 62, and pawls 63 to 66 made of, for example, synthetic resin are disposed on the outer circumference of the mounting tube 24. Pawls 63 to 66 are formed to stand upright in a natural state, and by tilting down or deforming pawls 63 to 66, the mounting tube 24 is inserted into the mounting hole 23. When the flanges 61, 62 abut against the edge of the mounting hole 23, the instrument panel 22 is pinched between flanges 61, 62 and the raised pawls 63 to 66, and the mounting tube 24 thus is fitted into the mounting hole 23. The raised pawls 63 to 66 may be formed by cutting parts of the mounting tube 24. In such case, the cut portions are raised upright to press against the instrument panel 22 when the mounting tube 24 is inserted into the mounting hole 23 and the flanges 61, 62 abut against edges of the mounting hole 23. The car-mounted device 21 is housed in the thus mounted mounting tube 24. A front panel 25 of device 21 projects with a step from a main body 26. At opposite side walls 26a, 26b of the main body 26 are fixed mounting pieces 27, 27a by means of screws 29, 29a.

Figure 4:
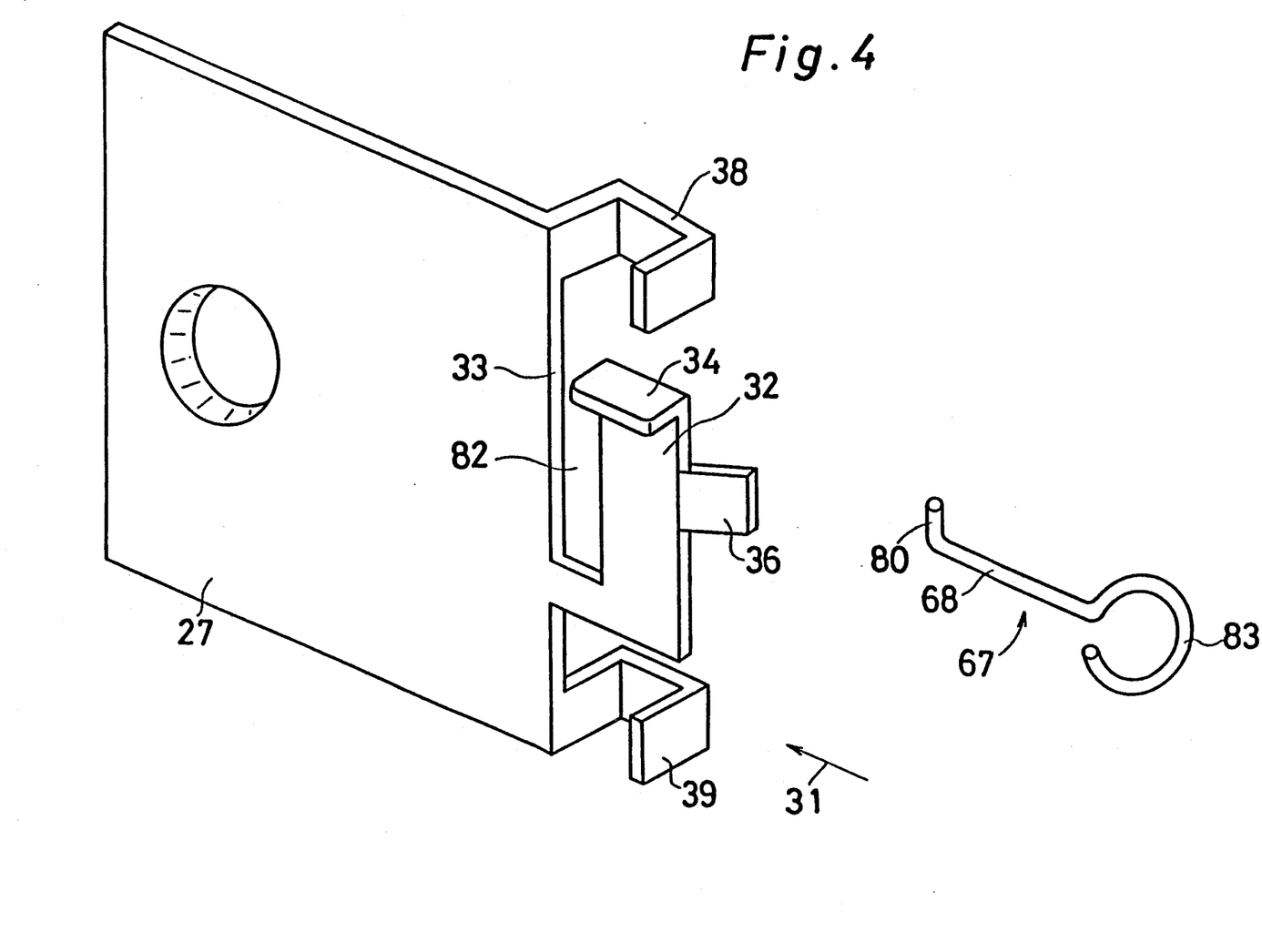
FIG. 4 is an enlarged perspective view of a mounting piece.

FIG. 4 is a perspective view showing the mounting piece 27 at an enlarged scale. Referring simultaneously to FIGS. 2 to 4, at an end face 33 of piece 27, at the upstream end thereof, in inserting direction 31 of the car-mounted device 21, is formed an elastic piece 32 that is angularly dislocatable within a flat plane perpendicular to inserting direction 31. On elastic piece 32 are formed a detent pawl 34 and a guide piece or tab 36 to be used when canceling a detent state of detent pawl 34, according to a procedure discussed below. Support pieces 38, 39 each having a U-shaped cross-sectional configuration, are formed at opposite upper and lower ends of end face 33, spaced from elastic piece 32. Support pieces 38, 39 are engaged with engaging holes 43, 44 of support plates 41, 42 projecting from the back side of a frame body 40 for decorative use. When frame body 40 is installed around the front panel 25, a gap 45 formed between the main body 26 and mounting tube 24 is concealed, so that appearance is enhanced. Mounting piece 27a is constructed in the same manner as the mounting piece 27 and corresponding parts thereof are identified with the subscript "a" added to the reference numbers of the parts of the mounting piece 27.

When the car-mounted device 21 on which the frame body 40 is thus placed is, when inserted into the mounting tube 24, elastic pieces 32, 32a are dislocated in the direction of arrows 48, 48a against the spring force of the elastic pieces 32, 32a, as the detent pawls 34, 34a are guided by guide walls 46, 46a extended from side walls 24a, 24b of the mounting tube 24. When the car-mounted device 21 is further inserted, the detent pawls 34, 34a fit into detent holes 51, 51a formed in the vicinity of the base end portions of guide walls 46, 46a. As a result, the car-mounted device 21 is fitted into the mounting tube 24, that is, the mounting hole 23.

To dismount the car-mounted device 21, a special tool 67 as shown in FIG. 4 is used. That is, an end portion 80 bent by 90 degrees from a shaft 68 is formed at the end of tool 67. This end portion 80 is inserted through insertion holes 81 or 81a formed in the frame body 40 and is guided by the guide pieces 36 or 36a to slots or notches 82 or 82a in mounting pieces 27 or 27a. The elastic pieces 32 or 32o a re dislocated in the directions of arrows 48 or 48a by the diameter of shaft 68, against the spring force of elastic pieces 32 or 32a, and the detent pawls 34 or 34a thereby are removed from the detent holes 51 or 51a. Then, by rotating the shaft 68 of the tool 67, the end portion 80 enters notches 82 or 82a and thereby is hooked on the elastic pieces 32 or 32a. By pulling a grip 83 in this state, main body 21 can be removed from the mounting tube 24.

Figure 5:
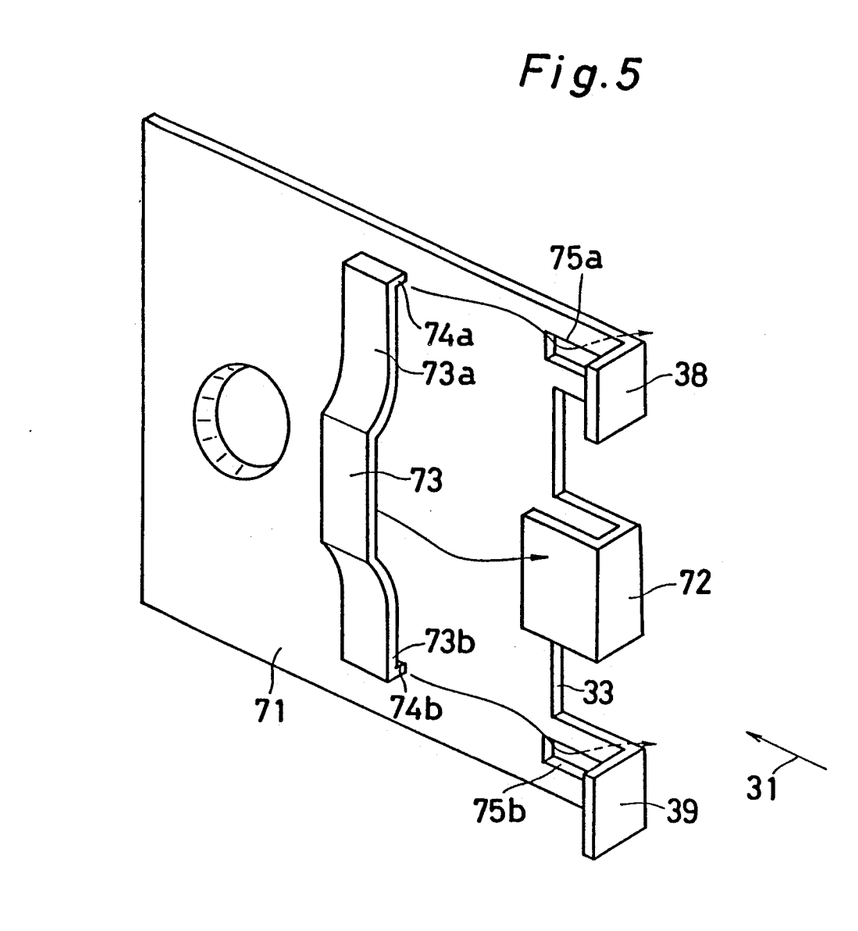
FIG. 5 is a perspective view of a mounting piece of another embodiment of this invention.

FIG. 5 is a perspective view of a mounting piece 71 according to another embodiment of this invention. It is similar to the mounting piece 27 discussed above, and corresponding parts are identified by same reference numbers. In this embodiment, a raised elastic piece 73 formed with a raised center portion is fixed, by welding or the like, to a support part 72 formed in a bent U-shape and extending from the end face 33. Opposite ends 73a, 73b of the elastic piece 73 are bent nearly 90 degrees, and form detent pawls 74a, 74b which respectively project through windows 75a, 75b formed in the vicinity of the base end parts of the support pieces 38, 39 so as to extend into the detent holes formed in the mounting tube 24.

Thus, in the mounting structure according to these embodiments, since the elastic pieces 32, 32a or 73 are formed to be elastic in directions perpendicular to the inserting direction 31 of the car-mounted device 21, the extent of projection of the front panel 25 from the instrument panel 22 can be reduced, and appearance thus can be enhanced. Since the appearance is improved by this method of mounting the car-mounted device 21 by insertion from the front of the instrument panel 22, this mounting method could be employed in Japan, and parts of the Japanese market products and overseas market products can be standardized and commonly used, so that reductions of costs can be expected.

Figure 6:
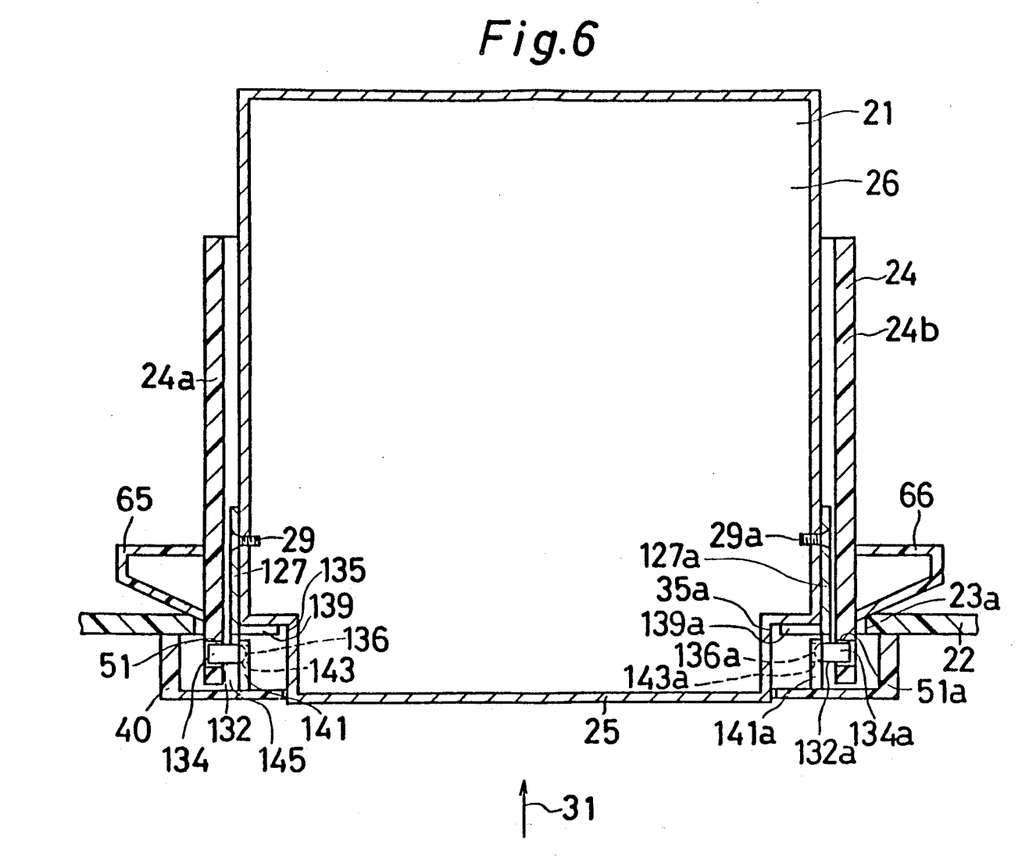
FIG. 6 is a sectional view showing a mounting structure of a car-mounted device of still another embodiment of this invention.
Figure 7:
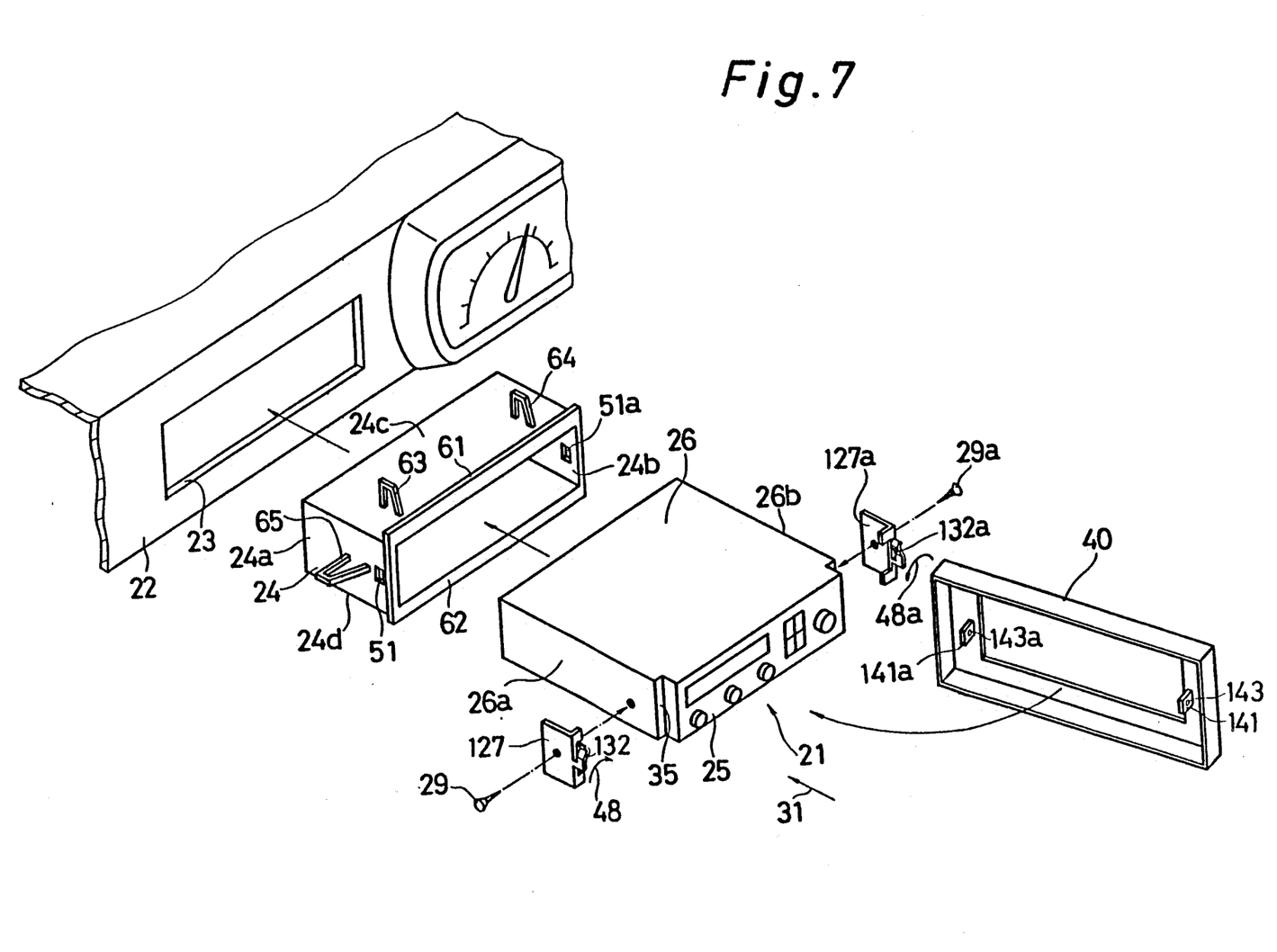
FIG. 7 is a perspective exploded view of the mounting structure shown in FIG. 6.
Figure 8:
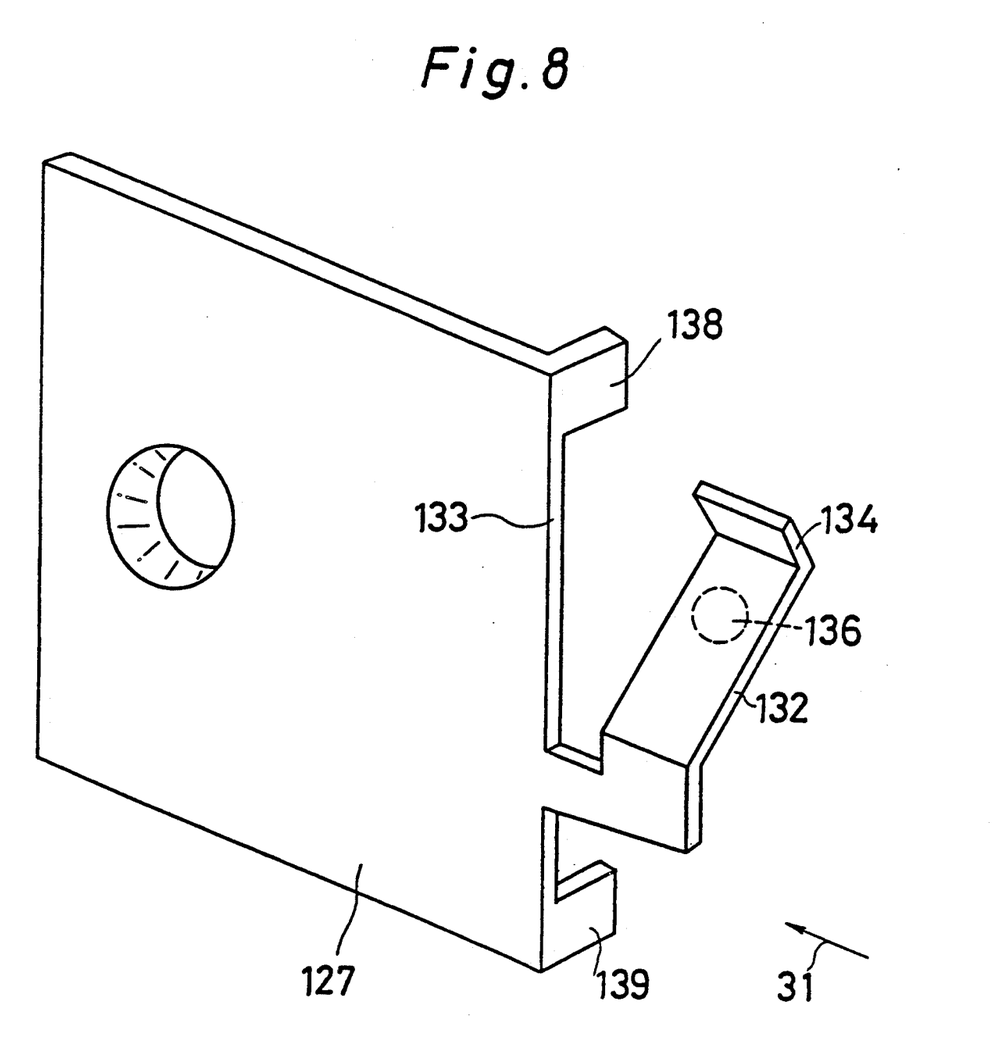
FIG. 8 is a magnified perspective view of a mounting piece.

FIG. 6 is a sectional view showing a mounting structure of car-mounted device 21 of another embodiment of this invention, FIG. 7 is a perspective exploded view showing its mounting procedure, and FIG. 8 is a perspective view showing a mounting piece 127 on an enlarged scale. Incidentally, the parts corresponding to the embodiments mentioned above are identified with the same reference numbers. At an end face 133 at an upstream end, in an inserting direction 31 of car-mounted device 21, is formed an elastic piece 132 that is angularly dislocatable within a flat plane perpendicular to inserting direction 31. On elastic piece 132 are formed a detent pawl 134 and a fitting protrusion 136 for supporting a frame body 40. The elastic piece 132 is bent in a direction to be spaced from the main body 26, that is in the direction of an arrow 48 in FIG. 7. Abutting pieces 138, 139 are formed at opposite ends of end face 133, spaced from opposite sides of the elastic piece 132. Abutting pieces 138, 139 abut against a step surface 35 of the main body 26. The fitting protrusion 136 fits with a fitting hole 143 of a support or positioning plate 141 projecting from the back side of the frame body 40 for decorative use. A mounting piece 127a is constructed in the same manner as the mounting piece 127, and corresponding parts thereof are identified by the subscript "a" added to the reference numbers of the parts of the mounting piece 127.

When the car-mounted device 21 is inserted into the mounting tube 24 and is disposed in a specified position therein, the frame body 40 is set in place. By the frame body 40 thus fitted around the peripheral edge of the front panel 25, a gap 145 formed between the main body 26 and the mounting tube 24 is concealed, and appearance thus is improved. When the frame body 40 is set, fitting holes 143, 143a receive fitting protrusions 136, 136a of the elastic pieces 132, 132a, and the elastic pieces 132, 132a are pushed and dislocated in the directions opposite to arrows 48, 48a, resisting the elastic force thereof. Thus, detent pawls 134, 134a fit into the detent holes 51, 51a formed in the vicinity of the opening of the side walls 24a, 24b of the mounting tube 24. Hence, the car-mounted device 21 is installed in the mounting tube 24, that is, the mounting hole 23.

Upon removal of the frame body 40, the elastic force of the elastic pieces 132, 132a moves elastic pieces in directions to cancel the detent state, i.e. in the directions of arrows 48, 48a. Therefore, by detaching the frame body 40 from the main body 26, the elastic pieces 132, 132a are restored to their normal conditions, allowing the detent pawls 134, 134a to escape from the detent holes 51, 51a, so that the car-mounted device 21 may be relatively easily dismounted from the mounting tube 24.

In this manner, according to the mounting structure of this embodiment, since the elastic pieces 132, 132a are formed to be deflectable in directions perpendicular to the inserting direction 31 of the car-mounted device 21, the extent of projection of the front panel 25 from the instrument panel 22 can be reduced, so that the appearance may be improved. Since the appearance of the mounting structure for inserting the car-mounted device 21 from the front of the instrument panel 22 is improved, this mounting method may be employed in Japan, and therefore the parts of Japanese market products and overseas market products can be standardized and commonly used, so that reductions of cost may be expected.

Incidentally, the elastic pieces 132, 132a, in their natural state, are bent such that they are withdrawn from the detent holes in the main body 26. Therefore, the detent state is canceled simply by removing the frame body 40, since this restores the elastic pieces 132, 132a to their natural state. Thus, the detent state of the detent pawls 134, 134a can be canceled without the need for a special tool, such as 57 of the first embodiment. As a result, operating efficiency when dismounting the car-mounted device 21 can be improved.

The invention may be embodied in other specific forms without departing from the spirit or essential characteristics thereof. The present embodiment are therefore to be considered in all respects as illustrative and not restrictive, the scope of the invention being indicated by the appended claims rather than by the foregoing description, and all changes that come within the meaning and the range of equivalency of the claims are therefore intended to be embraced therein.

I claim:

1. A structure for mounting in and dismounting from an instrument panel of an automotive vehicle a car-mounted device, such as a radio or a tape player, having a main body and a front panel extending from the main body with the width of the front panel being less than the width of the main body to define a step therebetween at each side thereof, said structure comprising:

a mounting tube to be inserted forwardly through a mounting hole in the instrument panel and retained therein, such that the car-mounted device can be inserted in an insertion direction forwardly into said mounting tube, said mounting tube having opposite side walls having therein respective detent holes;

a pair of mounting members to be attached to respective opposite sides of the main body of the car-mounted device;

each said mounting member having integral therewith at a position of juncture an elastic member extending in a direction generally along the height dimension of said mounting tube, said elastic member being spaced from said mounting member by a slot, said elastic member being urged outwardly by the elastic force thereof to a normal position and being deflectable therefrom against said elastic force thereof about said position of juncture in a plane perpendicular to said insertion direction, said elastic member having an outwardly directed detent pawl and said elastic member having extending inwardly therefrom a guide tab;

when said mounting members are mounted with the car-mounted device in said mounting tube, said elastic members being deflected about said respective positions of juncture in respective said planes in the area of the respective step between the main body and the front panel of the car-mounted device, and said detent pawls extending into respective said detent holes; and a dismounting tool for removing each said detent pawl from the respective said detent hole, said tool including a longitudinal shaft having a substantially L-shaped end capable of being inserted into contact with each said guide tab to deflect the respective said elastic member from said normal position to remove said detent pawl from said detent hole, and wherein by turning said tool about the axis of said shaft said L-shaped end is insertable into said slot to hook said elastic member, whereby pulling of said tool enables removal of said mounting member and the car-mounted device from said mounting tube.

2. A structure as claimed in claim 1, wherein said side walls of said mounting tube have extending therefrom guide members for guiding said elastic members upon insertion of said mounting members into said mounting tube.

3. A structure as claimed in claim 1, wherein each said mounting member has extending therefrom at least one support member to engage with a decorative frame to be installed about the installed car-mounted device.

4. In an assembly including a car-mounted device, such as a radio or a tape player, having a main body and a front panel extending from said main body with the width of said front panel being less than the width of said main body to define a step therebetween at each side thereof, and a structure for mounting said car-mounted device in and dismounting said car-mounted device from an instrument panel of an automotive vehicle, the improvement wherein said structure comprises:

a mounting tube to be inserted forwardly through a mounting hole in the instrument panel and retained therein, such that said car-mounted device can be inserted in an insertion direction forwardly into said mounting tube, said mounting tube having opposite side walls having therein respective detent holes;

a pair of mounting members attached to respective opposite sides of said main body of said car-mounted device;

each said mounting member having integral therewith at a position of juncture an elastic member extending in a direction generally along the height dimension of said mounting tube, said elastic member being spaced from said mounting member by a slot, said elastic member being urged outwardly by the elastic force thereof to a normal position and being deflectable therefrom against said elastic force thereof about said position of juncture in a plane perpendicular to said insertion direction, said elastic member having an outwardly directed detent pawl and said elastic member having extending inwardly therefrom a guide tab;

when said mounting members are mounted with said car-mounted device in said mounting tube, said elastic members being deflected about said respective positions of juncture in respective said planes in the area of the respective said step between said main body and said front panel of said car-mounted device, and said detent pawls extending into respective said detent holes; and a dismounting tool for removing each said detent pawl from the respective said detent hole, said tool including a longitudinal shaft having a substantially L-shaped end capable of being inserted into contact with each said guide tab to deflect the respective said elastic member from said normal position to remove said detent pawl from said detent hole, and wherein by turning said tool about the axis of said shaft said L-shaped end is insertable into said slot to hook said elastic member, whereby pulling of said tool enables removal of said mounting member and said car-mounted device from said mounting tube.

5. The improvement claimed in claim 4, wherein said side walls of said mounting tube have extending therefrom guide members for guiding said elastic members upon insertion of said mounting members into said mounting tube.

6. The improvement claimed in claim 4, wherein each said mounting member has extending therefrom at least one support member to engage with a decorative frame to be installed about said installed car-mounted device.

* * * * *